Nov. 20, 1934.  R. J. HOFFMAN  1,981,701

FLYING WING

Filed Sept. 18, 1933

RAOUL J. HOFFMAN
INVENTOR

BY James R. McKnight
ATTORNEY

Patented Nov. 20, 1934

1,981,701

UNITED STATES PATENT OFFICE 1,981,701

FLYING WING

Raoul J. Hoffman, Chicago, Ill., assignor of one-half to J. L. Younghusband, Chicago, Ill.

Application September 18, 1933, Serial No. 689,821

2 Claims. (Cl. 244—12)

My invention relates to a flying wing for aircraft.

Among the objects of my invention are to create an aircraft having a lower landing speed and more efficient flight due to an undisturbed flow of air over the aircraft and such other objects, advantages and capabilities as are inherently possessed by my invention and as will later more fully appear.

While I have shown herein preferred embodiments of my invention yet I wish it understood that the same are susceptible of modification and change without departing from the spirit of my invention.

Figure 1:
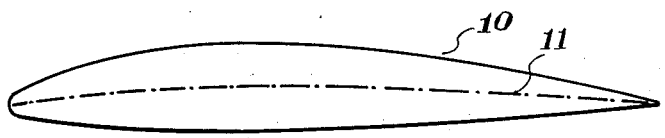
Figure 2:
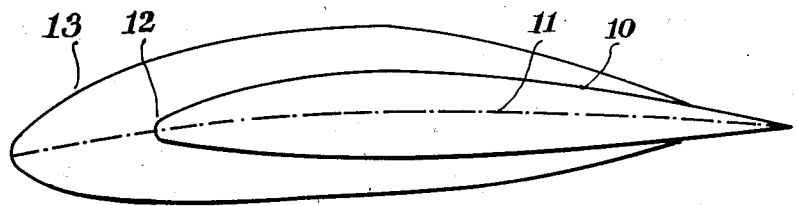
Figure 3:
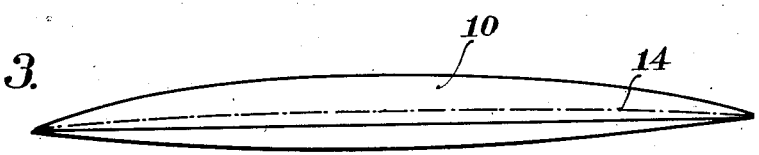
Figure 4:
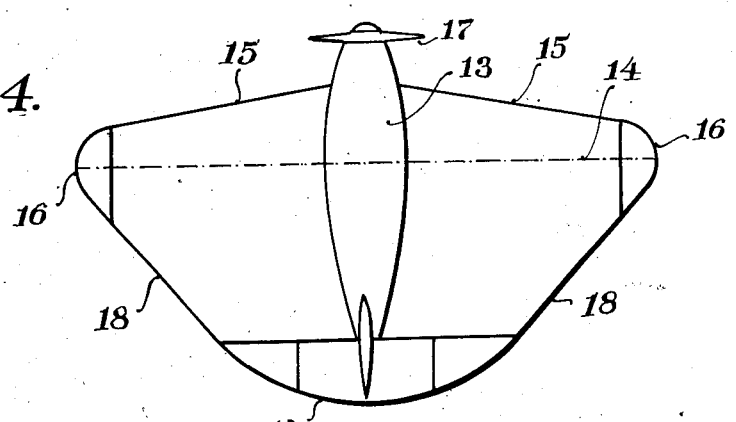
Figure 5:
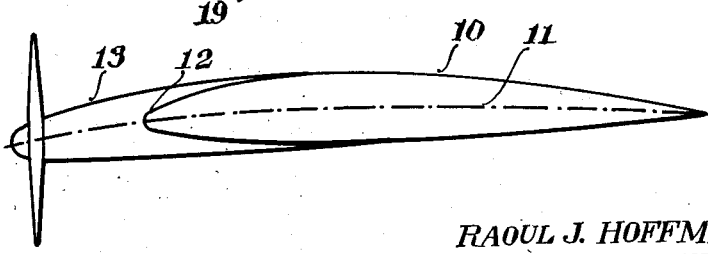

Referring more particularly to the drawing: Fig. 1 shows a median line of a wing in longitudinal section in the direction of air flow; Fig. 2 shows an extension of the median line of the wing with the addition of the body having equidistant upper and lower dimensions; Fig. 3 shows the median line of a wing in maximum lateral cross section; Fig. 4 is a plan view of an aircraft constructed in accordance with my invention; Fig. 5 illustrates the wing and body where the maximum thickness is the same.

Referring more particularly to the embodiments selected to illustrate my invention I supply a flying wing 10 which has a longitudinal median line 11. This longitudinal median line 11 is extended ahead of the leading edge 12 of the wing 10 and the body 13 follows the median line so that the proportions of the body 13 are in the same geometrical proportions in relation to the streamline of the wing 10. The upper and lower portions of both the body 13 and the wing 10 are equidistant from the median line 11. As shown in Fig. 3 the lateral median line 14 is drooped to afford greater air cushioning and therefore to obtain lower landing speed. By drooping the median line 14 the tip vortexes are reduced. My body 13 is substantially the same thickness geometrically as the wing section adjacent the body 13. Fig. 4 more particularly shows straight leading edges 15, rounded tips 16, extended body 13 for moving means 17, straight trailing edges 18 and curved rear portion 19 for controls. The thickness ratio of the flying wing reduces laterally towards the ailerons.

Having thus described my invention, I claim:

1. An aircraft having a low landing speed and an efficient flight due to a substantially undisturbed flow of air over the aircraft, comprising in combination a body, a flying wing, said body extended in front of said wing containing the power plant, an elevator forming the unbroken rounded rear end of said wing, a pair of stabilizers forming the outer edges of said wing, and a pair of ailerons forming the tips of said wing, the median line of said body and all median lines of the wing being upwardly convex.

2. An aircraft comprising a flying wing, a body having motive means and extending ahead of said flying wing, the front edge of said flying wing inclined inwardly and forwardly toward the body on each side thereof, said flying wing having rounded tips, straight trailing edges and an unbroken curved rear portion for controls, the median line of the body and all the median lines of the flying wing being upwardly convex.

RAOUL J. HOFFMAN.